United States Patent

[11] 3,624,579

[72] Inventor Elmer A. Carlson
 Agoura, Calif.
[21] Appl. No. 74,578
[22] Filed Sept. 23, 1970
[45] Patented Nov. 30, 1971
[73] Assignee Honeywell Inc.
 Minneapolis, Minn.

[54] ANTICIPATING THERMOSTAT
 5 Claims, 1 Drawing Fig.
[52] U.S. Cl. .................................................. 335/100,
 337/38, 337/95, 337/102
[51] Int. Cl. ............................................. H01h 61/00
[50] Field of Search ........................................ 337/95,
 100, 102, 38, 103

[56] References Cited
 UNITED STATES PATENTS
3,378,658 4/1968 Arlin et al. .................... 337/38
2,325,511 7/1943 Heintzen ...................... 337/100
2,574,869 11/1951 Green .......................... 337/95
1,780,302 11/1930 Koch ........................... 337/102
2,778,902 1/1957 Visos ........................... 337/103 X
3,144,547 8/1964 Price ........................... 337/103 X
 FOREIGN PATENTS
1,154,555 9/1963 Germany ...................... 337/103

Primary Examiner—Bernard A. Gilheany
Assistant Examiner—F. E. Bell
Attorneys—Lamont B. Koontz and Robert S. Craig ABSTRACT: A room thermostat for heating systems having an anticipating heater energized when the thermostat is not calling for heat and acting on an auxiliary temperature sensing element acting in a reverse sense from the main sensing element. A two-wire thermostat is thus provided which has a fixed value anticipating heater that need not be changed to match the load.

PATENTED NOV 30 1971
3,624,579
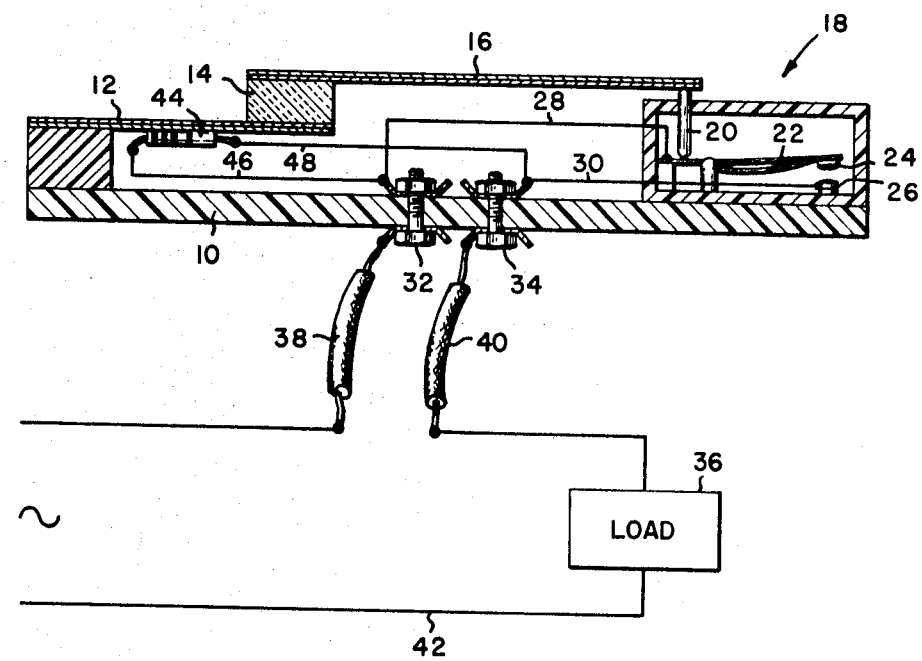
INVENTOR.
ELMER A. CARLSON
BY
Robert S Craig
ATTORNEY.

ANTICIPATING THERMOSTAT

In the usual anticipating thermostat controlling a heating system, the anticipating heater is energized when the contacts are closed and there is a call for heat. The amount of heat available from the anticipating heater is selected to be greater than the thermal differential of the thermostat and consequently if space temperature is slightly below the normal thermostat "on" temperature the thermostat will cycle without change in space temperature. Ordinarily, the anticipating heater is thermally associated with the space temperature responsive element.

In conventional two-wire anticipating thermostats for heating control the heater is connected in series with the switch contacts. In thermostats intended for pilot duty the heater may be in the form of a slide wire resistance which is provided with a scale so that the proper resistance may be selected to match the load and provide a desirable cycling rate. Such an arrangement is shown in Kronmiller U.S. Pat. No. 2,729,719.

If a two-wire thermostat is to be used to directly control a load, such as an electric heater, the anticipating heater will have a very low resistance and it is not practical to make it adjustable. Instead, different values of resistance are obtained by substitution. In one production version of the thermostat shown in Anderson U.S. Pat. No. 3,277,260 instruction chart is provided giving five different ways to change the amount of heat to match different loads, different heater strips or none being placed in the circuit as necessary. This is quite a complicated procedure compared to the slide wire heater used in pilot duty, and less likely to be carried out properly.

One alternative to this complicated heater problem in heavy duty thermostats is to use a heater connected in parallel with the load, and hence independent of load. A high resistance heater is used as it is energized by full line voltage. The objection to this arrangement is the cost of running a third wire to the thermostat.

According to the present invention a two-wire thermostat system is provided in which an anticipating heater is wired across the contacts and is energized when the load is deenergized. The impedance of the anticipating heater is very high compared to that of the load, so the load is effectively deenergized when the contacts are open. Anticipation is accomplished by having a temperature sensing element separate from the main or ambient temperature responsive element, which separate sensing element is heated by the anticipating heater and responds in the opposite sense, i.e., increased temperature of the ambient responsive element tends to open the contacts while increased temperature of the separate sensing element as caused by the anticipating heater tends to close the contacts. As a result, deenergization of the anticipating heater during load energization tends to open the contacts, and the effect is the same as in a conventional "on cycle" anticipating thermostat.

The single FIGURE of the drawing is a view, partly in section, of a thermostat embodying the invention.

The illustrated heating control thermostat is shown in simplified form with the usual adjusting mechanism omitted. A base 10 of insulating material carries a first bimetal element 12. The right hand end of element 12 deflects downwardly on an increase in temperature. A heat insulating block 14 carried by the right hand end of element 12 in turn carries a second bimetal element 16. The right hand end of element 16 deflects upwardly on an increase in temperature. The effective length of element 16 is considerably greater than element 12 so that the combined effect is that the right hand end of element 16 deflects upwardly on an increase in ambient temperature.

A snap switch 18 has a pin plunger 20 mechanically interconnecting bimetal element 16 and a switch blade 22. Blade 22 carries a movable contact 24 which cooperates with a stationary contact 26. Blade 22 and contact 26 are connected by wires 28 and 30 to terminals 32 and 34 on base 10. Terminals 32 and 34 are adapted to connect a load 36 to a source of power by wires 38, 40 and 42. On a drop in ambient temperature switch contacts 24 and 26 will close and the load 36 will be energized to supply heat to the space controlled by the thermostat.

An electrical resistor 44 is attached to bimetal element 12 so as to be in heat transfer relation thereto. Wires 46 and 48 connect resistor 44 to terminals 32 and 34. On a call for heat with contacts 24 and 26 closed the resistor 44 is shorted out and no heat is supplied to bimetal 12. However, when the thermostat is satisfied and contacts 32 and 34 are open, resistor 44 is energized from the source of power through the load 36. The impedance of resistor 44 is very high compared to that of the load so that the current passing through the load has negligible effect. The load, in effect, remains deenergized.

The value of resistor 44 is selected to supply sufficient heat to bimetal element 12 to cause a deflection at the right hand end of bimetal element 16 slightly more than the switch differential. Thus, if there has been no call for heat for some time and the switch eventually closes due to a drop in temperature, the resistor 44 will be deenergized and bimetal element will start to cool. After a predetermined time bimetal element 12 will cool sufficiently to open the switch, even though ambient temperature has not risen appreciably. This action, then, is the same as in the usual "on cycle" anticipating thermostat where the artificial heat is applied to the ambient temperature sensing element.

While the artificially heated element is shown attached to the base, the same effect could be had by securing the main ambient sensing element to the base and locating the artificially heated element between the main element and the switch. Likewise, the artificially heated element could be arranged to bodily position the switch. The only requirement is that the artificially heated element affect switch operation in the right direction.

The embodiments of the invention in which an exclusive property or right is claimed are defined as follows:

1. A room thermostat comprising, a switch, first and second thermostatic elements movement of which in response to ambient temperature actuate said switch, said first thermostatic element being more responsive to ambient temperature than said second thermostatic element, as electrical resistance associated with said second thermostatic element, said second thermostatic element being arranged to operate said switch in a reverse sense with respect to the operation of said first thermostatic element, a base carrying said thermostatic elements, said switch and said resistance, a pair of terminals on said base, and electrical connections between said terminals, said switch, and said resistance connecting said resistance across said terminals and in parallel with said switch.

2. A thermostat according to claim 1 in which said switch has contacts that close on reduction in temperature of said first thermostatic element.

3. A thermostat according to claim 1 in which said thermostatic elements are mechanically connected by heat insulating means.

4. A thermostat according to claim 2 in which said thermostatic elements are mechanically connected by heat insulating means.

5. A thermostat according to claim 1 in which said switch has an appreciable operating differential and the heat supplied to said second thermostatic element by said resistance is sufficient to drive said switch through its operating differential.

* * * * *